April 15, 1941.    G. T. GRAVES    2,238,489
MEASURING VALVE
Filed Jan. 14, 1939
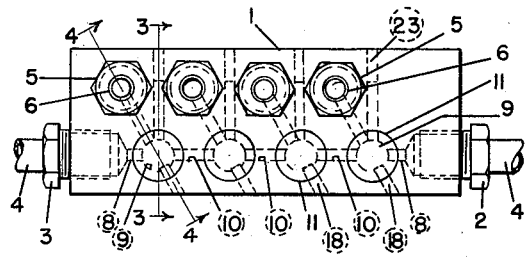
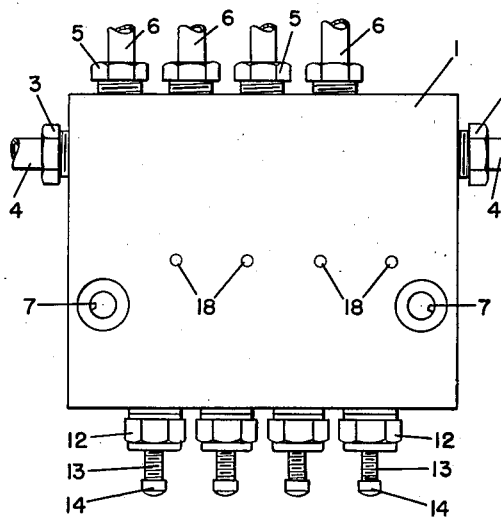
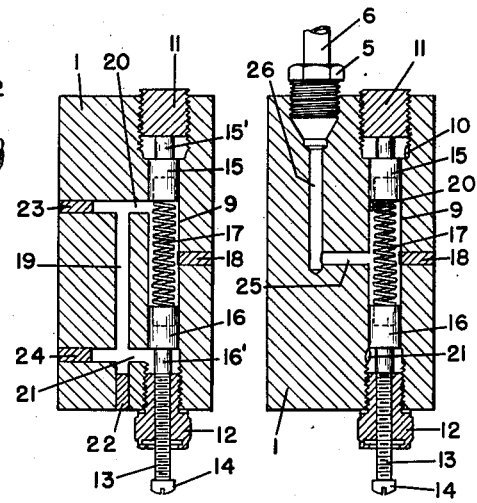
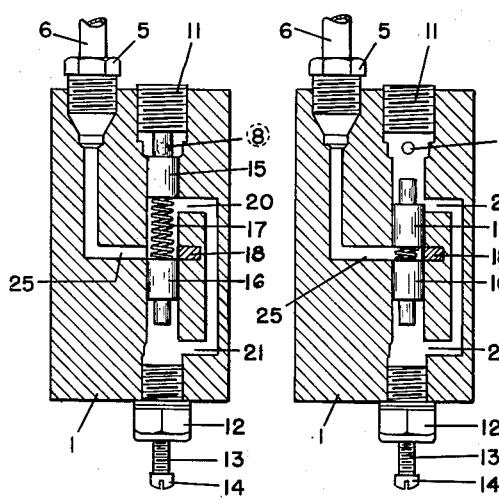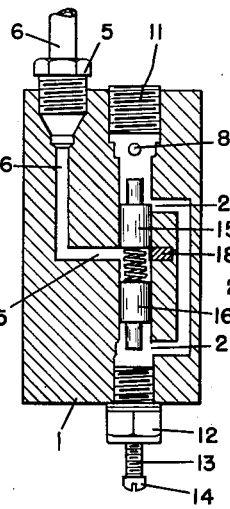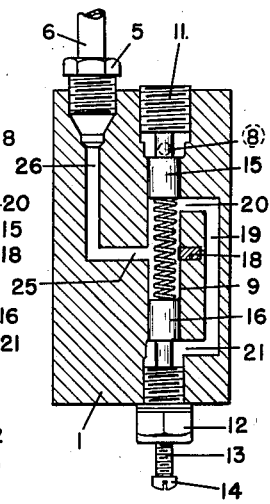
INVENTOR.
GEORGE T. GRAVES
BY Oberlin, Limbach & Day
ATTORNEYS.

Patented Apr. 15, 1941

2,238,489

UNITED STATES PATENT OFFICE 2,238,489

MEASURING VALVE

George T. Graves, Bedford, Ohio, assignor to The Farval Corporation, Cleveland, Ohio, a corporation of Ohio Application January 14, 1939, Serial No. 250,996

2 Claims. (Cl. 184—7)

The present invention relates to a lubricant measuring valve adapted to be used in a lubricating system of the single line type, i. e., a system wherein lubricant, such as oil or grease, is supplied from a pressure source or pump to a single supply line circuit, with the measuring valves connected in such line at points adjacent the bearings or lubricant delivery points of the machinery or similar apparatus to which the lubricant is to be supplied in measured amounts.

The general object and nature of my invention is to provide such a measuring valve which is relatively simple in construction and efficient and positive in operation. Briefly stated, the valve operates upon the principle of introducing a quantity of lubricant into a measuring chamber, transferring such lubricant to a second chamber upon relief of lubricant supply pressure, and finally discharging a measured amount of lubricant upon the application of repeated lubricant supply pressure. Additional objects and advantages of the invention shall become apparent as the following description proceeds.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a top plan view of a structure embodying my measuring valve in the form of a four valve manifold block; Fig. 2 is a side elevational view of Fig. 1; Fig. 3 is a cross-sectional view taken substantially along line 3—3 of Fig. 1; Fig. 4 is a sectional view taken substantially along line 4—4 of Fig. 1; and Figs. 5 to 8 inclusive are schematic sectional views in which the several parts and passages of the blank have been transposed into a single plane for convenience in illustration, and showing the valve pistons in various positions during a cycle of operation.

Now referring more particularly to the drawing, there is shown therein a manifold block 1 which comprises the housing for the valve parts. The block 1 in the drawing is shown in the form of what is known as a manifold block containing four separate measuring valves. It should be obvious that one or more measuring valves could equivalently be incorporated in block 1. The tube fittings 2 and 3 are threadably mounted in the side of the block 1 and serve as means for connecting the latter to the lubricant pressure supply line 4. Similar tube fittings 5 connect to the outlet or bearing lines 6. Countersunk holes 7 are provided in the block 1 for mounting the latter upon a supporting surface by means of fastening bolts.

Inlet ports 8 connect the supply line 4 to the upper portion of the valve cylinders 9 at each end of the manifold block. The trunk ports 10 are continuations of the ports 8, connecting all valve cylinders 9 to the supply line 4.

The tops or inlet ends of the cylinders 9 are enclosed by means of the threaded plugs 11. The bottom and opposite ends of the cylinders 9 are closed by means of the threaded bushings 12 in which the adjusting screws 13, having the fillister machine screw heads 14, are mounted.

A pair of pistons 15 and 16 are mounted in the cylinder 9 and are normally urged outwardly away from each other and into abutment against the closed ends of the cylinder by means of the compression spring 17. The pistons 15 and 16 are counterbored in their mutually opposed sides in order to provide cylindrical recesses for the reception of the ends of the spring 17. The pistons 15 and 16 also have the reduced diameter projecting lugs 15' and 16' respectively on their outer ends which serve the purpose of admitting the exertion of lubricant pressure so that it will be effective against the ends of the pistons when the latter are in fully extended position.

An abutment or stop pin 18 projects slightly into the interior of the cylinder 9, and serves as means for limiting the inward movement of the pistons 15 and 16. The abutment pin 18 also serves as a means for sealing the hole drilled through from the exterior of the block 1 to form the outlet port 25.

A transfer passage 19 is drilled in the block 1 parallel to the cylinder 9. The port 20 connects one end of the passage 19 to the cylinder 9 at a point intermediate the extremities of the path of travel of the piston 15. Another port 21 connects the other end of the passage 19 to the bottom end of the cylinder 9. Since the passage 19, ports 20 and 21 are most conveniently formed by means of holes drilled through from the exterior of the block 1, their outer ends are filled or plugged with the inserts 22, 23 and 24 respectively.

An outlet port 25 leads from the cylinder 9 at a point located centrally of the latter, or adjacent the innermost limits of travel of the pistons 15 and 16, to the outlet passage 26, the fitting 5 and bearing connecting line 6.

The mode of operation of the above described structure is illustrated in Figs. 5 to 8 inclusive:

Beginning with the position of the parts as shown in Fig. 5, it is assumed that the interior of the valve, particularly the cylinder 9 in the space between the pistons 15 and 16, the transfer passage 19, the outlet port 25, and outlet passage 26 are filled with lubricant. Lubricant under pressure is then admitted through the inlet port 8 and forces the piston 15 inwardly of the cylinder 9 until the piston 15 passes and clears the port 20. At this point, lubricant enters the port 20, passes through the transfer passage 19 to the port 21 and into the opposite end of the cylinder 9 where its pressure is exerted to force the piston 16 in an upward direction.

The pistons 15 and 16 are shown in Fig. 6 in positions illustrating the operation of the valve up to this point. The piston 15 has come to rest against the stop pin 18. The piston 16 has commenced to travel upwardly in the cylinder 9, displacing lubricant from the spring side of the piston outwardly through the outlet port 25.

As the lubricant pressure continues to be exerted upon the piston 16, it travels to its furthest upper or inward movement, coming to rest against the stop pin 18, as shown in Fig. 7. At this point, all of the lubricant in the cylinder 9 behind the piston 16 has been displaced. This displaced lubricant represents the measured amount of lubricant discharged by the valve.

The lubricant pressure is next relieved, customarily by short circuiting the supply line 4 from the system pump to the reservoir (latter elements not shown). The pistons 15 and 16, under the action of the spring 17, will then tend to return to their initial or normal positions. Piston 15, however, will move first and before piston 16, since the relief of pressure will first be effective upon piston 15. The latter piston will then travel to its outermost limit, opening the port 20 to the cylinder 9 on the spring side of the piston 15. The piston 16 then travels to its outermost position, transferring lubricant from the lower end of the cylinder 9, through the transfer passage 19, through the port 20 to that portion of the cylinder 9 surrounding the spring 17, returning the parts to the position shown in Fig. 5.

It is to be noted that the piston 15 displaces lubricant during its initial travel and from its spring side in an amount represented by the distance between the point where the inner end of the piston 15 first closes off the port 20 to the point where the piston 15 comes to rest against the stop pin 18. But when the piston 15 starts on its return travel, it reabsorbs this same amount from the outlet port 25 and discharge passage 26. Hence only that amount of lubricant represented by the displacement travel of the piston 16 remains in the outlet port 25 and discharge passage 26 and therefore constitutes the measured amount of lubricant ultimately delivered to the bearing.

Adjustment of the position of the adjusting screw 13 determines the extent of travel of the piston 16. Thus, by moving the screw 13 inwardly with respect to the cylinder 9, the measured amount of discharged lubricant can be decreased; and conversely, by moving it outwardly, such amount can be increased.

The piston 15 thus functions as a means for regulating the transfer of lubricant from the lubricant pressure to the spring side of the piston 16 and hence in some of the appended claims is termed a "transfer piston." The piston 16 determines the amount of measured lubricant ultimately discharged from the valve and hence in some of the appended claims is termed a "measuring piston."

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a lubricant measuring valve, the combination of a casing having a cylinder therein, an inlet port in constant communication with one end of said cylinder, an outlet port communicating with the central portion of the cylinder, and a transfer passage having one end opening into the other end of said cylinder, said cylinder having a single control port positioned intermediate said inlet and outlet ports and connecting said cylinder with the other end of said transfer passage, a piston valve mounted in one end of said cylinder for reciprocal movement intermediate said inlet and outlet ports, a measuring piston mounted for reciprocal movement in the other end of said cylinder, a compression spring mounted in said cylinder between opposed sides of said pistons and urging said pistons outwardly away from each other, outward movement of said piston valve being limited by the end of the cylinder in which it is mounted, an abutment member limiting inward movement of said piston valve against the action of said compression spring, said piston valve being adapted to occupy a normal outer control position on one side of said single control port and an inner control position on the other side of said single control port, said piston valve when in its normal outer position being operable to disconnect said inlet port from said control port and being operable upon movement to its inner position against the action of said compression spring to connect said single control port with said inlet port.

2. In a lubricant measuring valve, the combination of a casing having a cylinder therein, an inlet port in constant communication with one end of said cylinder, an outlet port communicating with the central portion of the cylinder, and a transfer passage having one end opening into the other end of said cylinder, said cylinder having a single control port positioned intermediate said inlet and outlet ports and connecting said cylinder with the other end of said transfer passage, a pair of pistons mounted in opposed relationship in said cylinder, a compression spring mounted in said cylinder between opposed sides of said pistons and urging said pistons outwardly away from each other, outward movement of said pistons being limited by the ends of said cylinder, and abutment means located in said cylinder adjacent said outlet port for limiting inward movement of both of said pistons toward each other, the piston in the first named end of said cylinder constituting a control piston adapted to occupy a normal outer control position and an inner control position, the control positions of said valve being respectively on opposite sides of said single control port, said control piston when in its normal outer position being operable to disconnect said inlet port from said control port and being operable upon movement to its inner position against the action of said compression spring to connect said single control port with said inlet port.

GEORGE T. GRAVES.